March 6, 1956  D. E. MOHR  2,737,398
INDEPENDENT SPRING SUSPENSION FOR DIRIGIBLE WHEELS
Filed Oct. 30, 1953  2 Sheets-Sheet 1

INVENTOR.
DONALD E. MOHR
BY
McMorrow, Berman + Davidson
ATTORNEYS

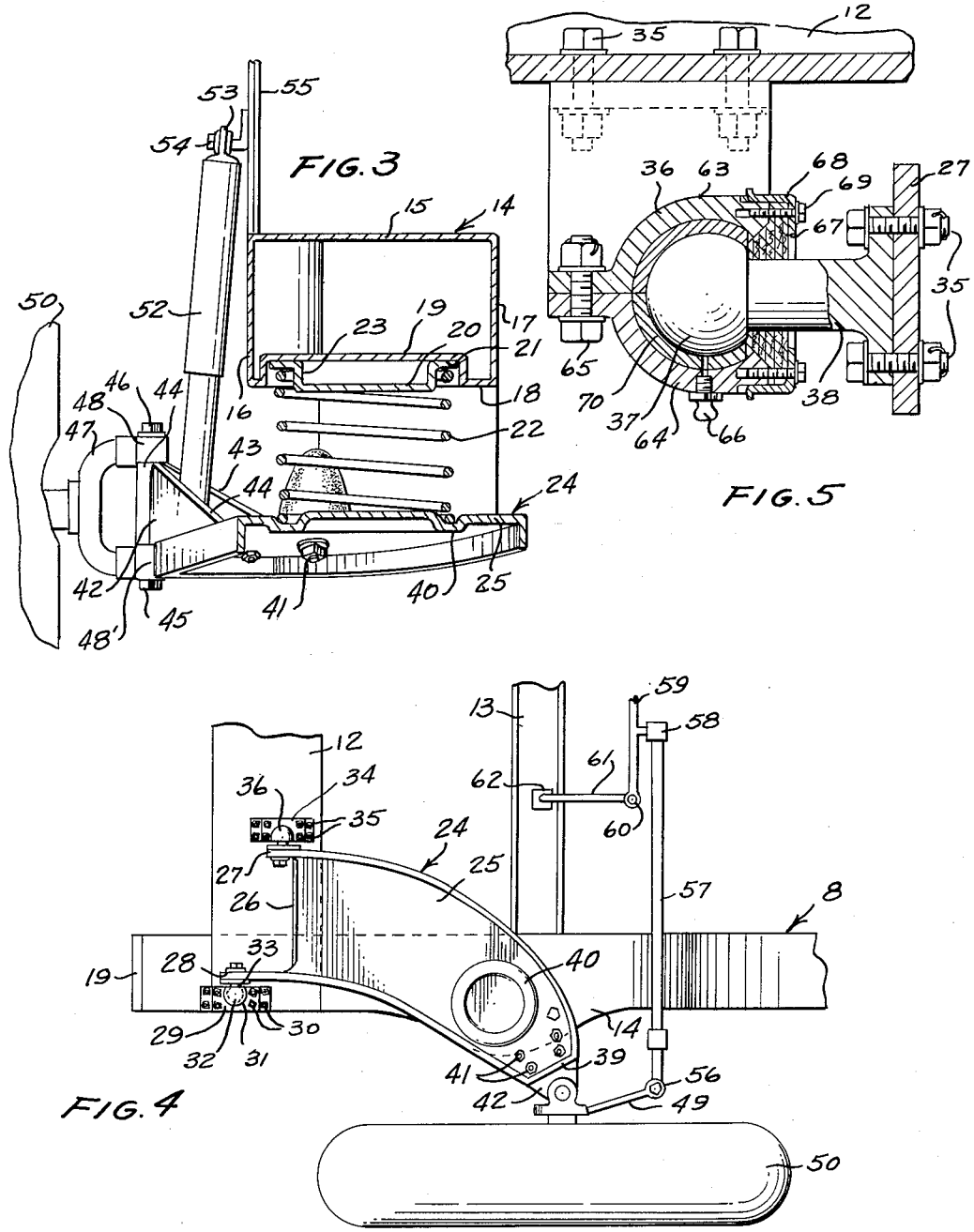

United States Patent Office 2,737,398
Patented Mar. 6, 1956

2,737,398

INDEPENDENT SPRING SUSPENSION FOR DIRIGIBLE WHEELS

Donald E. Mohr, Norfolk, Va.

Application October 30, 1953, Serial No. 389,262

8 Claims. (Cl. 280—96.2)

This invention relates to improvements in which suspensions for automotive vehicles, and more particularly to its improved wheel suspensions of independently sprung type wherein the usual upper control arm is replaced by a vertical shock absorber.

An important object of the invention is to provide simpler and more efficient wheel suspensions of the character indicated above which provide a smoother ride by hinging the wheels to the vehicle chassis at points forward of the wheels and on axes paralleling those of the wheels, wherein the wheels move upwardly and downwardly directly in line with the forces impinged on the wheels by road obstacles encountered by the wheels.

Another important object of the invention is to provide wheel suspensions of the character indicated above which enable vehicle construction having lower center of gravity through location of the suspension arms along and beneath the chassis side members and out of the space therebetween, thereby providing for lower mounting of the vehicle motor between the side members and greater road clearance.

A further object of the invention is to provide safer wheel suspensions of the character indicated above wherein the suspended wheels travel upwardly and downwardly in arcs such that the part of the wheel tires in contact with road leans outboardly and the top of the tire inboardly, and vice versa, when the suspensions are in positions other than neutral or intermediate positions.

Other important objects and advantageous features of the invention will be apparent from the following description and the accompanying drawings, wherein, for purposes of illustration rather than limitation, a specific embodiment of the invention is set forth in detail.

In the drawings:

Figure 3 is an enlarged fragmentary transverse vertical section taken on the line 3—3 of Figure 2;

Figure 4 is a bottom plan view of Figure 1; and

Figure 5 is an enlarged fragmentary transverse vertical section taken on the line 5—5 of Figure 2.

Figure 1:
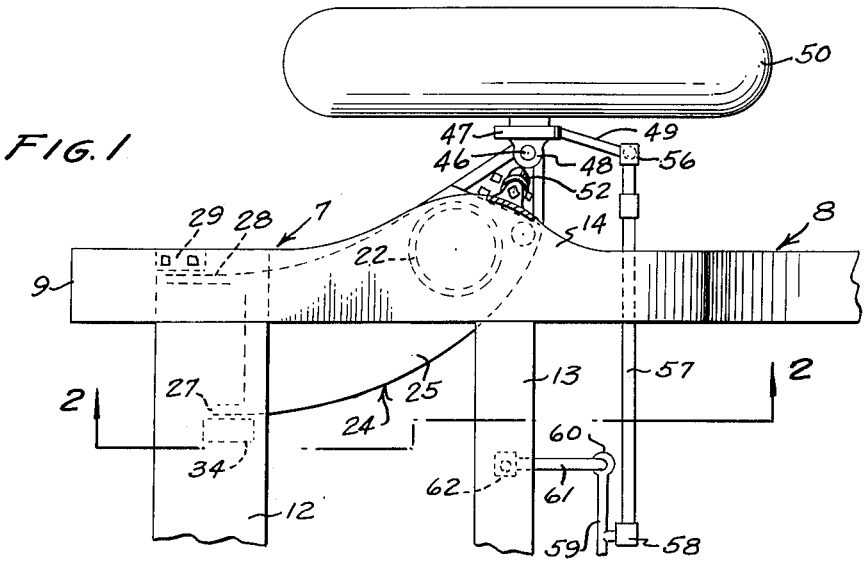
Figure 1 is a fragmentary top plan view showing a right hand front wheel suspension in accordance with the present invention.

Referring in detail to the drawings, wherein like numerals designate like parts throughout the several views, the numeral 7 designates the forward end portion of the right side member 8 of an automotive vehicle chassis. The chassis side member portion 7 is in the form of a low kick-up having a forward terminal end 9, and a rearwardly inclined straight part 10 which terminates at its rearward end in a downwardly curved part 11 which merges into the chassis side member 8.

A front cross member 12 is secured beneath a forward part of the straight part 10 and extends to and is similarly secured to the left hand chassis side member (not shown). It will be understood that the left hand wheel suspension (not shown) is the same in construction but reversed in position relative to that herein disclosed.

A rear cross member 13 is fixed to the said straight part 10 of the kick-up at a point spaced forwardly from the curved part 11, on a level above the front cross member 12.

An outwardly extending enlargement 14 of the chassis side member part 10 has its main portion positioned forwardly of the rear cross member 13. As shown particularly well in Figure 3 of the drawings, the enlargement 14 is of hollow or channel cross section, and includes a top wall 15, an outboard sidewall 16, and an inboard sidewall 17, and a bottom wall 18 which need be in area only long enough to embody an upset circular upper spring seat socket 19.

Secured concentrically in the socket 19 is an upper spring seat 20 having a peripheral flange 21 against which the upper end of a vertical helical spring 22 is engaged, with the spring 22 surrounding a depending cup formation 23.

A relatively rigid suspension lever or arm 24, preferably of inverted channel cross section, has a web 25 having a forward end 26 which is located beneath the front cross member 12. On the inboard end of the forward end 26 is a short inboard forward extension 27 and at the outboard end of the end 26 is a longer forward extension 28. The longer forward extension 28 is located beneath the straight kick-up part 10.

A ball joint bracket 29, fixed to the underside of the kick-up part 10 and the forward cross member 12, by bolts 30, has an inboardly directed socket 31 in which is confined a ball 32 having a shank 33 which traverses and is fixed to the longer forward extension 28. Another bracket 34, fixed to the underside of the front cross member 12 by bolts 35 at a point spaced rearwardly of the bracket 29 and spaced inboardly from the kick-up part 10, has a socket 36 in which is confined a ball 37 having a shank 38 traversing and fixed to the shorter forward extension 27 of the suspension arm 24. The axes of the ball shanks 33 and 38 are parallel and extend crosswise of the vehicle chassis at right angles to the longitudinal axis of the chassis.

The suspension arm 24 is relatively wide and relatively long and extends rearwardly in trailing relation to the ball and socket joints and their points of connection to the chassis frame. The arm 24 curves in a gradually arc rearwardly and in an outboard direction, and is slightly tapered to its rear end 39, which is located just beyond the outboard edge of the enlargement 14.

At a point in vertical alignment with the enlargement socket 19 in which the upper spring seat 20 is engaged, the rear portion of the web 25 of the arm 24 is provided with an annular depression 40 serving as a lower spring seat for the lower end of the spring 22.

Secured to the arm 24 at and projecting outwardly and rearwardly beyond the rear end 39 of the arm 24 by bolts 41 is a knuckle bracket 42 which includes laterally spaced triangular vertical plates 43, 44, as shown in Figure 3, on whose rearward altitude edges are upper and lower bearings 44, 45 through which extends a king-pin 46. The king-pin, in the neutral or intermediate position of the arm 24, is in a vertical plane which extends lengthwise of the vehicle chassis.

A wheel knuckle 47 has upper and lower arms 48 and 48', respectively, secured on the upper and lower ends of the king-pin 46 and engaged with the upper and lower bearings 44 and 45, respectively. A steering arm 49 is fixed to and extends rearwardly from the knuckle 47. The right front vehicle wheel 50 is mounted on the knuckle 47, with its axis parallel to the ground 51 in neutral position of the arm 24.

A vertical tubular shock absorber 52 is hinged at its upper end, as indicated at 53, on a pin 54 projecting outwardly from a bracket 55 rising from the outboard edge of the enlargement 14, the axis of the pin 54 being parallel to the axis of the ball joints. The shock absorber 52 is canted outboardly and downwardly at a slight angle and is hinged at its lower end to the knuckle bracket 42 at a point between the plates 43 and 44.

Pivoted to the rear end of the steering arm 49, as indicated at 56, is the outboard end of a transverse drag link 57, whose inboard end has a ball and socket connection 58, with an intermediate part of a transverse connecting link 59, which is parallel to the drag link 57 and spaced forwardly therefrom. The outboard end of the connecting link 59 has a pivotal connection, as indicated at 60, with the rear end of a longitudinal bellcrank or idler arm 61 which is supportably journalled on a vertical axis, as indicated at 62, to the rear cross member 13 and depends therefrom. The connecting link 59 is connected in conventional manner, to steering gear (not shown). The bellcrank 61 is calibrated in length to conform with steering arm 49 so that rod 57 maintains the lateral direction to ensure no change in its desired arc. The ball 37 directly engages in a socket bushing 70 confined in the socket.

As shown in Figure 5 of the drawings, a socket of a ball joint connection for the arm 24 may be composed of halves 63 and 64 secured together by bolt means 65, the half 64 being provided with a grease fitting 66. The open end of the socket is provided with an annular grease seal 67 held in place by an annular retainer ring 68 secured to the socket by screws 69, the grease seal 67 closely surrounding and engaging the ball shank 38.

Figure 2:
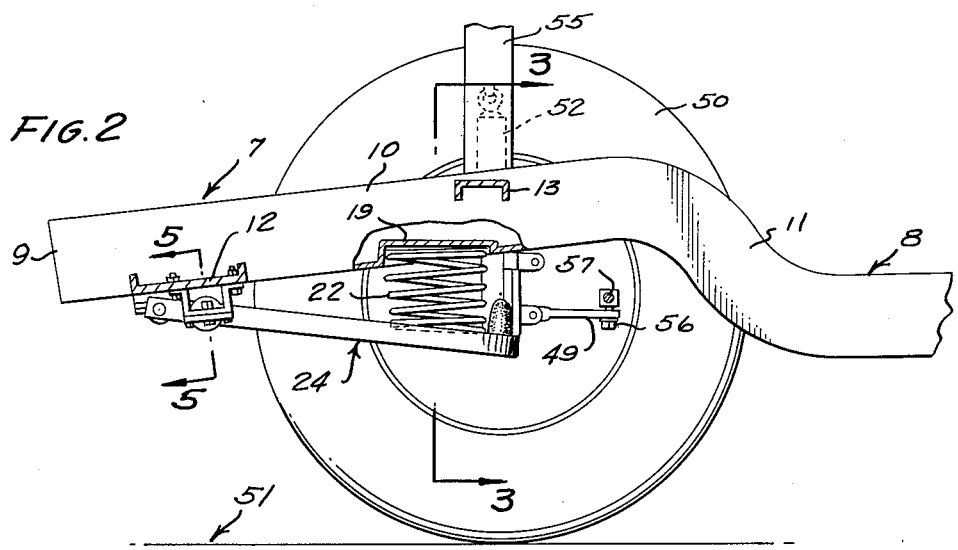
Figure 2 is a fragmentary vertical longitudinal section taken on the line 2—2 of Figure 1.

It is to be noted that the wheel 50 is farthest out from the chassis side member 8 in the neutral position of the suspension arm 24, which is at a slight rearward and downward angle, illustrated in Figure 2. In a right turn, centrifugal force throws the vehicle toward the left. This compresses the spring 22 of the left hand suspension (not shown) so that the distance of the top of the left wheel (not shown) from the chassis side member decreases and the lower end of the wheel, in contact with the road 50 increases, the effect being that the wheel leans against the direction of potential skid; and in this direction the right hand wheel 50 moves parallel to the left hand wheel, both wheels moving in the same arc.

The curvature of the arcs through which the wheels move is based upon the length of the drag link 57 and the arc through which it would move, the desired arc being determined by the offset of the ball joints of the suspension arm 24 relative to each other, the amount of offset of the ball joints being directly proportional to the length of the drag link 57.

What is claimed is:

1. In combination, a chassis including a longitudinal chassis side member having outboard and inboard sides, front and rear cross members secured at one end to said side member and extending inboardly therefrom, an outboardly extending enlargement on said chassis side member located in the region of said rear cross member, a trailing suspension arm having a forward end and a rear end, a major portion of the length of said suspension arm being located beneath said chassis side member, an inboard extension and an outboard extenison on and projecting forwardly from the forward end of said suspension arm, an inboard joint fixed on said front cross member inboardly of said chassis side member, an outboard joint fixed on said chassis side member, said joints being offset from each other lengthwise of said chassis side member, said inboard and outboard extensions being pivoted on the inboard and outboard joints, respectively, a knuckle mounting fixed on the rear end of said arm, a wheel knuckle pivoted on a vertical axis on said knuckle mounting, a vertical spring compressed between the said arm at a point near its rear end and an overlying portion of said enlargement, a bracket on said enlargement, and a vertical shock absorber having an upper end pivoted to said bracket and a lower end pivoted to said knuckle mounting.

2. In combination, a chassis including a longitudinal chassis side member having outboard and inboard sides, front and rear cross members secured at one end to said side member and extending inboardly therefrom, an outboardly extending enlargement on said chassis side member located in the region of said rear cross member, a trailing suspension arm having a forward end and a rear end, a major portion of the length of said suspension arm being located beneath said chassis side member, an inboard extension and an outboard extension on and projecting forwardly from the forward end of said suspension arm, an inboard joint fixed on said front cross member inboardly of said chassis side member, an outboard joint fixed on said chassis side member, said joints being offset from each other lengthwise of said chassis side member, said inboard and outboard extensions being pivoted on the inboard and outboard joints, respectively, a knuckle mounting fixed on the rear end of said arm, a wheel knuckle pivoted on a vertical axis on said knuckle mounting, a vertical spring compressed between the said arm at a point near its rear end and an overlying portion of said enlargement, a bracket on said enlargement, and a vertical shock absorber having an upper end pivoted to said bracket and a lower end pivoted to said knuckle mounting, said suspension arm curving in a rearward and outboard direction from its forward end to its rear end.

3. In combination, a chassis including a longitudinal chassis side member having outboard and inboard sides, front and rear cross members secured at one end to said side member and extending inboardly therefrom, an outboardly extending enlargement on said chassis side member located in the region of said rear cross member, a trailing suspension arm having a forward end and a rear end, a major portion of the length of said suspension arm being located beneath said chassis side member, an inboard extension and an outboard extension on and projecting forwardly from the forward end of said suspension arm, an inboard joint fixed on said front cross member inboardly of said chassis side member, an outboard joint fixed on said chassis side member, said joints being offset from each other lengthwise of said chassis side member, said inboard and outboard extensions being pivoted on the inboard and outboard joints, respectively, a knuckle mounting fixed on the rear end of said arm, a wheel knuckle pivoted on a vertical axis on said knuckle mounting, a vertical spring compressed between the said arm at a point near its rear end and an overlying portion of said enlargement, a bracket on said enlargement, and a vertical shock absorber having an upper end pivoted to said bracket and a lower end pivoted to said knuckle mounting, said inboard joint being displaced rearwardly with respect to said outboard joint.

4. In combination, a chassis including a longitudinal chassis side member having outboard and inboard sides, front and rear cross members secured at one end to said side member and extending inboardly therefrom, an outboardly extending enlargement on said chassis side member located in the region of said rear cross member, a trailing suspension arm having a forward end and a rear end, a major portion of the length of said suspension arm being located beneath said chassis side member, an inboard extension and an outboard extension on and projecting forwardly from the forward end of said suspension arm, an inboard joint fixed on said front cross member inboardly of said chassis side member, an outboard joint fixed on said chassis side member, said joints being offset from each other lengthwise of said chassis side member, said inboard and outboard extensions being pivoted on the inboard and outboard joints, respectively, a knuckle mounting fixed on the rear end of said arm, a wheel knuckle pivoted on a vertical axis on said knuckle mounting, a vertical spring compressed between the said arm at a point near its rear end and an overlying portion of said enlargement, a bracket on said enlargement, and a vertical shock absorber having an upper end pivoted to said bracket and a lower end pivoted to said knuckle mounting, said inboard joint being displaced rearwardly with respect to said outboard joint, the axes of said joints extending crosswise of said chassis at right angles to the longitudinal axis of the chassis, the turning axis of said suspension arm being on a line drawn through the centers of said joints and at an angle to the symmetrical axis of each of the individual joints.

5. In combination, a chassis including a longitudinal chassis side member having outboard and inboard sides, front and rear cross members secured at one end to said side member and extending inboardly therefrom, an outboardly extending enlargement on said chassis side member located in the region of said rear cross member, a trailing suspension arm having a forward end and a rear end, a major portion of the length of said suspension arm being located beneath said chassis side member, an inboard extension and an outboard extension on and projecting forwardly from the forward end of said suspension arm, an inboard joint fixed on said front cross member inboardly of said chassis side member, an outboard joint fixed on said chassis side member, said joints being offset from each other lengthwise of said chassis side member, said inboard and outboard extensions being pivoted on the inboard and outboard joints, respectively, a knuckle mounting fixed on the rear end of said arm, a wheel knuckle pivoted on a vertical axis on said knuckle mounting, a vertical spring compressed between the said arm at a point near its rear end and an overlying portion of said enlargement, a bracket on said enlargement, a vertical shock absorber having an upper end pivoted to said bracket and a lower end pivoted to said knuckle mounting, said inboard joint being displaced rearwardly with respect to said outboard joint, the axes of said joints extending crosswise of said chassis at right angles to the longitudinal axis of the chassis, the turning axis of said suspension arm being on a line drawn through the centers of said joints and at an angle to the symmetrical axis of each of the individual joints, and being in the same horizontal plane.

6. In combination, a chassis including a longitudinal chassis side member having outboard and inboard sides, front and rear cross members secured at one end to said side member and extending inboardly therefrom, an outboardly extending enlargement on said chassis side member located in the region of said rear cross member, a trailing suspension arm having a forward end and a rear end, a major portion of the length of said suspension arm being located beneath said chassis side member, an inboard extension and an outboard extension on and projecting forwardly from the forward end of said suspension arm, an inboard joint fixed on said front cross member inboardly of said chassis side member, an outboard joint fixed on said chassis side member, said joints being offset from each other lengthwise of said chassis side member, said inboard and outboard extensions being pivoted on the inboard and outboard joints, respectively, a knuckle mounting fixed on the rear end of said arm, a wheel knuckle pivoted on a vertical axis on said knuckle mounting, a vertical spring compressed between the said arm at a point near its rear end and an overlying portion of said enlargement, a bracket on said enlargement, and a vertical shock absorber having an upper end pivoted to said bracket and a lower end pivoted to said knuckle mounting, said joints being ball and socket joints.

7. In combination, a chassis including a longitudinal chassis side member having outboard and inboard sides, front and rear cross members secured at one end to said side member and extending inboardly therefrom, an outboardly extending enlargement on said chassis side member located in the region of said rear cross member, a trailing suspension arm having a forward end and a rear end, a major portion of the length of said suspension arm being located beneath said chassis side member, an inboard extension and an outboard extension on and projecting forwardly from the forward end of said suspension arm, an inboard joint fixed on said front cross member inboardly of said chassis side member, an outboard joint fixed on said chassis side member, said joints being offset from each other lengthwise of said chassis side member, said inboard and outboard extensions being pivoted on the inboard and outboard joints, respectively, a knuckle mounting fixed on the rear end of said arm, a wheel knuckle pivoted on a vertical axis on said knuckle mounting, a vertical spring compressed between the said arm at a point near its rear end and an overlying portion of said enlargement, a bracket on said enlargement, a vertical shock absorber having an upper end pivoted to said bracket and a lower end pivoted to said knuckle mounting, a steering arm fixed on and projecting rearwardly from said wheel knuckle, a transverse drag link having an outboard and an inboard end, the outboard end of the drag link being pivoted to said steering arm, a transverse connecting link having an outboard end pivoted to the inboard end of the drag link, said connecting link being parallel to and forwardly spaced from said drag link, and an idler arm having a forward end pivotally supported on said rear cross member and having a rear end, said connecting link having an outboard end pivoted to the rear end of the idler arm.

8. In combination, a chassis including a longitudinal chassis side member having outboard and inboard sides, front and rear cross members secured at one end to said side member and extending inboardly therefrom, an outboardly extending enlargement on said chassis side member located in the region of said rear cross member, a trailing suspension arm having a forward end and a rear end, a major portion of the length of said suspension arm being located beneath said chassis side member, an inboard extension and an outboard extension on and projecting forwardly from the forward end of said suspension arm, an inboard joint fixed on said front cross member inboardly of said chassis side member, an outboard joint fixed on said chassis side member, said joints being offset from each other lengthwise of said chassis side member, said inboard and outboard extensions being pivoted on the inboard and outboard joints, respectively, a knuckle mounting fixed on the rear end of said arm, a wheel knuckle pivoted on a vertical axis on said knuckle mounting, a vertical spring compressed between the said arm at a point near its rear end and an overlying portion of said enlargement, a bracket on said enlargement, a vertical shock absorber having an upper end pivoted to said bracket and a lower end pivoted to said knuckle mounting, a steering arm fixed on and projecting rearwardly from said wheel knuckle, a transverse drag link having an outboard and an inboard end, the outboard end of the drag link being pivoted to said steering arm, a transverse connecting link having an outboard end pivoted to the inboard end of the drag link, said connecting link being parallel to and forwardly spaced from said drag link, and an idler arm having a forward end pivotally supported on said rear cross member and having a rear end, said connecting link having an outboard end pivoted to the rear end of the idler arm, the length of said drag link being proportional to the offset of said joints relative to each other.

References Cited in the file of this patent

UNITED STATES PATENTS

| | | |
|---|---|---|
| 2,092,611 | Olley | Sept. 7, 1937 |
| 2,297,591 | Urich | Sept. 29, 1942 |
| 2,555,649 | Krotz | June 5, 1951 |
| 2,635,894 | Jackman | Apr. 21, 1953 |